Patented Mar. 9, 1926.

1,575,761

UNITED STATES PATENT OFFICE.

CHARLES HOFFMAN, OF TUCKAHOE, NATHAN MINTON CREGOR, OF NEW YORK, AND HARRY DAVETT GRIGSBY, OF BROOKLYN, NEW YORK, ASSIGNORS, BY MESNE ASSIGNMENTS, TO THE FLEISCHMANN COMPANY, OF NEW YORK, N. Y.

MANUFACTURE OF YEAST.

No Drawing.   Application filed March 22, 1922.   Serial No. 545,857.

*To all whom it may concern:*

Be it known that we, CHARLES HOFFMAN, NATHAN MINTON CREGOR, and HARRY DAVETT GRIGSBY, all citizens of the United States, and residing, respectively, at No. 137 Della Vista Avenue, Tuckahoe, New York, No. 26 West 83rd Street, New York city, and No. 105 Quincy Street, Brooklyn, New York, have invented certain new and useful Improvements in the Manufacture of Yeast; and we do hereby declare the following to be a full, clear, and exact description of the invention, such as will enable others skilled in the art to which it appertains to make and use the same.

The present invention relates to certain new and useful improvements in the manufacture of baker's yeast, whereby it is not only feasible to use raw materials of moderate cost, but whereby (in the preferred practice of the invention) the yield of yeast from a given weight of raw materials is greatly increased over that obtained in the practice of the usual methods of production. So also, in the fermentation of dough, incident to the manufacture of bread, this yeast is found to be stronger,—the fermenting of the dough being faster than with yeast made by the ordinary malting process. Furthermore, the yeast produced in accordance with our invention, is high in vitamines, and is, for that reason, particularly well adapted for use directly as an article of food, either in the compressed form, or when extracted for the obtaining of a product rich in vitamines for various uses.

In the polishing of rice, the germ and branny material is removed during the polishing operation and is collected as a brownish product which is known as rice polishings. It is high in mineral salts, fairly high in protein and contains a large amount of the so-called water-soluble B'' vitamines.

In the manufacture of wheat flours by the roller process of milling, there is formed, in addition to the branny material constituting the main body of the by-product, a separate or additional by-product containing the germ of the wheat and known commercially as "wheat germ." It contains usually from 5 to 40 per cent of bran and about 10 per cent of fine particles of flour, the remainder being the pure germ. The percentage of bran present in this commercial "wheat germ" varies with the prevailing practice in individual mills, some mills producing a germ almost free from bran and others producing a germ containing varying quantities of bran up to about 40 per cent as above noted.

In the manufacture of hominy, corn flour and corn meal from Indian corn or maize, there results a by-product consisting mainly of the pure "corn" germ or maize germ.

The cereal germs, and particularly the wheat germ and maize germ, are high in mineral salts and protein and rich in the so-called water-soluble B'' vitamines. Like rice polishings, they are by-products obtainable in large quantity and at a low price, and hence the raw materials of the types above specified might properly be referred to as "milling by-products."

In the practice of the present invention, it is feasible and desirable to make use of these raw materials; to wit: rice polishings, and cereal germs (particularly, wheat germs and maize germs, wheat germs being preferred). In fact, in so far as we are aware, the combined use of these materials, or the use of cereal germs alone in the manufacture of yeast is new, perhaps for the reason that, if such use has ever been attempted, it failed of acceptance because of the difficulties presented by the oil and unpalatable alkaloids and the like present in certain of these raw materials in their normal or untreated condition. Accordingly, as will hereinafter more fully appear, the raw materials referred to are subjected to a preliminary process of extraction for removal of their oily and other extractible objectionable constituents before entering into the further steps of the manufacture.

In so far as the cereal germ constituent is concerned, we greatly prefer the wheat germ (used alone, or in conjunction with the maize germ). In some instances, however, the wheat germ or the maize germ, or both, may be substituted in whole or in part by such other materials as the residue obtained from the pressing of maize germs, said residue being known as "corn press-cake," or by the residue from ground roasted peanuts after the mechanical pressing of peanut oil therefrom, or by cotton-seed "press cake," or by cocoanut "press-cake." So also in our opinion the rice polishings may be substituted (although to lesser advantage) either in whole or in part by other starchy materials containing protein and otherwise available in the manufacture.

In the use of the foregoing raw materials, whatever they may be, whatever oil may still be contained therein should be extracted by means of a suitable solvent, say by benzol, or by carbon tetrachloride, which will likewise extract other constituents undesirable from the standpoint of the subsequent steps of the process as has been heretofore indicated. The oil thus extracted will constitute a useful by-product of the manufacture.

After the extraction of the oil, the raw materials hereinbefore referred to, are cooked until the starch present is gelatinized. The gelatinized starch is then saccharified by any suitable saccharifying agent, as, for instance, by the action of an infusion of malt introduced into the cooled cooking liquor for that purpose, the diastase present in the malt serving as a saccharifying agent. At the terminating of the saccharifying operation, molasses (ordinary dark molasses is suitable for the purpose) is added to the cooled cooking liquor and thoroughly incorporated therewith. So also, if desired, appropriate substances such as, for example, equal parts by weight of ammonium chloride and calcium carbonate may be added. The wort thus obtained is seeded with yeast and the subsequent operations resulting in the obtaining of the final yeast product are carried on with aeration in the usual manner well understood in the yeast making art.

One of the main advantages of the present invention resides, however, in supplementing the saccharifying step of the process by the employment of a digestive ferment, whose principal function is to bring the proteins present into solution and yeast assimilable condition. Papain is particularly useful in this connection, and by its employment it is found that the resultant yeast product is much more flocculent than that of ordinary yeast, and that it settles much more rapidly. Indeed, the yeast obtained by the use of papain as a digestive ferment appears to be particularly vigorous, and the results obtained by the use of such yeast in the fermentation of the dough batch are especially satisfactory.

The following will serve as a typical illustration of the practice of the invention. Take 16⅔ pounds of rice polishings and 16⅔ pounds of wheat germ as low in bran as possible and free the mixture from its vegetable fat by an extracting process,— a suitable extracting agent for the purpose being either benzol or carbon tetrachloride. The extraction of the oil is found, in most instances, to be accompanied with the extraction of certain bitter or acrid substances which may be present in certain of these raw materials.

After the extraction of the oil, the raw materials referred to are cooked in say 300 pounds of water so as to thoroughly gelatinize the starch contained in them. The cooked mixture is then cooled down to about 100° F. to 120° F., and an infusion of barley malt is then added. The infusion of barley malt may be obtained by infusing 16⅔ pounds of barley malt in 100 pounds of water for one-half to one hour at 100° F. to 110° F. The malt infusion thus added is sufficient to supply enough diastase to ultimately effect solution of the starches present, and their conversion into sugar. It will also be convenient to add at the same time enough water to the batch to bring it up to 1000 pounds.

Thereupon, the batch is kept at a temperature of 100° F. to 115° F. for from one-half to one hour. The temperature of the batch is then raised to 150° to 160° F. for fifteen to thirty minutes to complete saccharification of the starch. At this point 50 pounds of molasses (ordinary dark molasses will suffice) is stirred into the batch, together with from .05 pounds to .10 pounds of the digestive ferment papain, whose function is to ultimately bring into solution by the proteolytic enzymes present a large proportion of the proteins in the batch. Upon the addition of the molasses and papain the temperature of the batch is raised to 190° to 200° F. for about ten minutes, and then more rapidly to the boiling point, to destroy all enzymes present. The papain may be added before raising the temperature of the batch to 150° F. but it is preferred, as above noted, to add it at the same time that the molasses is stirred into the batch. Filtration then follows as hereinafter described.

The wheat germ is naturally acid and this acidity usually exists in the batch after the action of the papain thereon. If, in any instance, the batch does not show acidity at that time it is preferable to add sufficient acid thereto to give a slightly acid reaction just before filtration, which is facilitated by the presence of a small quantity of acid in the batch.

The digestion above described is best accomplished in a beer mash-tun or similar apparatus provided with suitable stirrers and with a suitable steam-heating jacket or other appropriate heating means.

After digestion, the liquid is tapped from the bottom, and is thus strained clear by the insoluble residue acting as a filter; or it is filtered clear by a filter press, or by any other suitable apparatus or method. To the filtered liquid thus obtained is preferably added two pounds of calcium carbonate and two pounds of ammonium chloride, which are intended to aid in the yeast propagation. The resultant wort is then to be seeded by say five pounds of yeast.

Under these conditions, a net yield of 40 pounds of compressed yeast, in the final product has been obtained. When the papain is omitted (the other ingredients employed being exactly the same) a yield of but 34 pounds of compressed yeast has been obtained. The striking advantage of the use of papain in the process is thus plainly apparent—an increase of 6 pounds in yield being obtained in the typical instance described.

Having described our invention, what we claim as new and desire to secure by Letters Patent, is:

1. A process of manufacturing baker's yeast which comprises preparing a mash by gelatinizing starch-containing materials including cereal germs and polishings, saccharifying the mass with malt and digesting with papain, filtering off the liquid and thereafter propagating yeast therein with aeration.

2. A process of manufacturing baker's yeast which comprises preparing a mash by gelatinizing starch-containing materials including rice polishings, saccharifying the mass with malt, mixing molasses therewith, digesting the mixture with papain, filtering off the liquid, adding to the filtrate ammonium chloride and calcium carbonate and thereafter propagating yeast therein with aeration.

3. A process of manufacturing baker's yeast which comprises preparing a mash by extracting oil from starch-containing milling by-products such as cereal germs and polishings, gelatinizing the extracted mass, saccharifying with malt and digesting with papain, filtering off the liquid and thereafter propagating yeast therein with aeration.

4. A process of manufacturing baker's yeast which comprises preparing a mash by extracting oil from raw starch containing materials including rice polishings, gelatinizing the extracted mass, saccharifying with malt, mixing molasses therewith, digesting the mixture with papain, filtering off the liquid, adding to the filtrate ammonium chloride and calcium carbonate and thereafter propagating yeast therein with aeration.

In testimony whereof I affix my signature.

CHARLES HOFFMAN.

In testimony whereof I affix my signature.

NATHAN MINTON CREGOR.

In testimony whereof I affix my signature.

HARRY DAVETT GRIGSBY.